Patented Dec. 5, 1950

2,532,489

UNITED STATES PATENT OFFICE 2,532,489

COMPOSITION FOR PRESERVING ARTICLES OF FOOD AND THE LIKE

Carl S. Ferguson, Newton, Mass.

No Drawing. Application February 18, 1946,
Serial No. 648,557

2 Claims. (Cl. 106—125)

This invention relates to a method of treating objects such as articles of food for the purpose of inhibiting or retarding various tendencies toward deterioration of one kind or another, and also to a new composition of matter which is not only effective for such purposes but is also water soluble and edible.

An object of this invention is to provide a surface coating material which may be applied to certain classes of fresh perishable foods for the purpose of retarding decay, preventing undue loss of natural moisture, inhibiting growth of molds and bacterial contamination from without, and, by partial sealing from the air, retarding the development of undesirable changes resulting from oxidative processes.

Another object is to provide a surface coating material for perishable foods prior to freezing storage for the purpose of retarding dehydration, the development of rancidity, and the growth of low-temperature yeasts, molds and other organisms and for prevention of the condition of discoloration and surface changes known as "freezer-burn," while frozen.

A further object is to provide a surface coating material for fresh fruits and vegetables which will, in addition to the properties enumerated above, also have the property of retarding ripening, so that the fruit may be picked at a stage of ripeness and maturity beyond what has been customary in contemplation of given periods and conditions of shipment or storage, resulting in a product of greater value and desirability, which will nevertheless keep properly in such periods and conditions of shipment or storage.

In some cases, the preserving coat may be employed on fruit or vegetables which have to be picked prematurely for some reason as, for example, to save a crop from frost or blight. The coating will retard the ripening process, but can be washed off later with warm water if it becomes desirable to resume the ripening process at the natural uninhibited rate.

A further object is to provide a coating material which may be applied to paper and other materials commonly used for the wrapping of, or as containers and packages for, food products, for the purpose of protection and preservation thereof, retention of natural moisture, crispness, and other desirable physical characteristics thereof, and prevention of insect infestation.

In order to provide a suitable coating material for the purpose hereinbefore set forth, I employ a mixture of edible, water soluble substances comprising a mold inhibiting substance having hygroscopic properties and preferably also wetting properties. With this substance is mixed one or more gum-like substances for the purpose of providing a semi-porous characteristic to the coating. Preferably, I include a suitable colloid and a suitable gum or its equivalent.

For the mold inhibiting substance, I preferably employ propylene glycol. This substance possesses hygroscopic qualities, is an effective wetting agent, and serves to inhibit the growth of molds, not only in the article covered by the coating but also in the coating itself. The wetting characteristic of the propylene glycol is of particular value in cases where the coating substance is applied to foods which have oily skins and to such products as meats which may have fatty surfaces.

The colloidal substance may be gelatine, agar-agar, pectin or Irish-moss. The gum substance may be gum arabic, locust bean gum, dextrin, tragacanth, Karaya, water soluble shellac or oat flour, especially a fraction of oat flour having a low starch content, this fraction possessing gum-like properties and being also an anti-oxidant.

One function of the colloid in the mixture is to prevent complete sealing of the article encased by the coating as well as to give body to the film. Complete sealing is not desirable since it prevents "breathing" of the article, that is, a gradual exchange of gases such as oxygen and carbon dioxide between the article and the surrounding atmosphere. It is desirable that a certain amount of "breathing," by diffusion through the coating be permitted, the coating serving to retard such diffusion but not to cut it off entirely. The colloid also provides a vehicle for the propylene glycol, being compatible therewith and preserved thereby. While a limited amount of "breathing" or diffusion of gases through the coating is desirable, the escape of moisture from the article should be prevented as far as possible so as to reduce shrinkage and loss of weight to a minimum. This object is achieved in satisfactory measure by the hygroscopic property of the propylene glycol which reduces the rate of escape of moisture to a point far below that which would otherwise take place through the semi-porous coating.

The gum substance provides partial sealing of the article coated, the degree of sealing depending on the proportion of the other substances in the mixture. The gum substance also provides a valuable adhesive characteristic to the mixture and lends thereto a free flowing quality when liquefied. The gum substance also results in a desirable toughness and hardness in the dried film.

By way of a specific example, I may employ a mixture containing propylene glycol, gelatin and gum arabic in the following proportions:

| | | |
|---|---|---|
| Propylene glycol | gallons | 1 to 2 |
| Gelatin | pounds | 6 to 9 |
| Gum arabic | do | 6 to 9 |
| Water | gallons | 4 to 6 |

In preparing a coating substance from the above ingredients, the gelatin and gum arabic are dissolved in water which is sufficiently hot for the purpose. The propylene glycol is then added and the solution is mixed, the resulting solution being somewhat viscous. Upon cooling, the solution becomes a stiff gel which must be warmed to the liquid state for use. The mixture is sufficiently liquid at temperatures between 120° and 160° F. The actual temperature of application in any particular case would depend largely on the article to be treated, but would be within the stated limits.

The solution may be applied to the articles to be coated by dipping, spraying, or flotation. The coating is then allowed to cool and dry. Instead of applying the coating directly to the surface of the article, the coating substance, preferably diluted, may be applied to absorbent fibrous sheet material such as paper, or to other suitable flexible sheet material.

After a sheet of paper or the like has thus been coated, the article can be wrapped therein to protect it from deterioration, insect infestation, et cetera.

I claim:

1. A new composition of matter for coating and preserving articles of food, said composition consisting of an aqueous solution of propylene glycol, gelatin and gum arabic in the proportion of 1 to 2 gallons of propylene glycol, 6 to 9 pounds of gelatin, and 6 to 9 pounds of gum arabic.

2. A new composition of matter for coating and preserving articles of food, said composition consisting of an aqueous solution of propylene glycol, gelatine, and an edible gum in the proportion of one to two gallons of propylene glycol, six to nine pounds of gelatine, and six to nine pounds of gum.

CARL S. FERGUSON.

REFERENCES CITED

The following references are of record in the file of this patent:

UNITED STATES PATENTS

| Number | Name | Date |
|---|---|---|
| 1,192,765 | Durkel | July 25, 1916 |
| 1,529,170 | Conomos | Mar. 10, 1925 |
| 2,189,947 | Griffith | Feb. 13, 1940 |
| 2,313,124 | Champion | Mar. 9, 1943 |
| 2,377,402 | Cooke et al. | June 5, 1945 |
| 2,427,857 | Hamill | Sept. 23, 1947 |
| 2,477,742 | Hall | Aug. 2, 1949 |

FOREIGN PATENTS

| Number | Country | Date |
|---|---|---|
| 14,178 | Australia | Apr. 22, 1929 |
| 495,352 | Great Britain | Nov. 11, 1938 |

OTHER REFERENCES

"Uses and Applications of Chemicals and Related Materials," vol. II, 1944 edition, p. 275, by T. C. Gregory, Reinhold Publishing Corp., 330 W. 42nd Street, New York city, New York.